United States Patent [19]

Karabinis

[11] 4,403,351
[45] Sep. 6, 1983

[54] METHOD AND APPARATUS FOR DISTINGUISHING BETWEEN MINIMUM AND NON-MINIMUM PHASE FADES

[75] Inventor: Peter D. Karabinis, Atkinson, N.H.

[73] Assignee: Bell Telephone Laboratories, Incorporated, Murray Hill, N.J.

[21] Appl. No.: 328,121

[22] Filed: Dec. 7, 1981

[51] Int. Cl.³ .............................................. H04B 1/10
[52] U.S. Cl. ................................... 455/304; 455/52; 455/65; 455/306
[58] Field of Search .................. 455/52, 65, 137–139, 455/303–306, 205; 375/40, 100

[56] References Cited

U.S. PATENT DOCUMENTS

| | | | |
|---|---|---|---|
| 3,452,156 | 6/1969 | Engelbrecht | 455/52 |
| 3,537,008 | 10/1970 | Lakatos | 455/65 |
| 4,281,411 | 7/1981 | Bonn et al. | 375/100 |
| 4,330,764 | 5/1982 | Miedema | 455/304 |

OTHER PUBLICATIONS

"A New Selective Fading Model: Application to Propagation Data" by W. D. Rummler, pp. 1037–1053, BSTJ, vol. 58, No. 5, May–Jun. 1979.

Primary Examiner—Jin F. Ng
Attorney, Agent, or Firm—David R. Padnes

[57] ABSTRACT

The fade character of a received double-sideband, phase coherent signal is determined from the location of the fade notch frequency, ($\omega_F$) relative to the center ($\omega_c$) of the received signal frequency spectrum and the phase between fundamental components of first ($P_1$) and second ($P_2$) product signals. These product signals are derived (401, 403, 411, 413, 419, 420, 421 or 801, 802, 803, 805, 811) using first ($\omega_1$) and second ($\omega_2$) spectral components that are symmetrically disposed about the center of the received signal frequency spectrum. The fundamental components of each product signal are at a common frequency.

16 Claims, 8 Drawing Figures

| LOCATION OF FADE NOTCH ($L_{FN}$) | VALUE OF $\theta$ RELATIVE TO $\theta_0$ ("$\theta$") | D.C. COMPONENT OF $P_c$ | FADE TYPE (F) OUTPUT |
|---|---|---|---|
| $\omega_f < \omega_c$ "0" | $\theta < \theta_0$ "0" | X | MPF "1" |
| $\omega_f < \omega_c$ "0" | $\theta > \theta_0$ "1" | X | NMPF "0" |
| $\omega_f > \omega_c$ "1" | $\theta < \theta_0$ "0" | X | NMPF "0" |
| $\omega_f > \omega_c$ "1" | $\theta > \theta_0$ "1" | X | MPF "1" |
| $\omega_f = \omega_c$ $L_{FN} =$ "1" | X | (+)"1" | MPF "1" |
| $\omega_f = \omega_c$ | X | (−)"0" | NMPF "0" |

X = DON'T CARE

METHOD AND APPARATUS FOR DISTINGUISHING BETWEEN MINIMUM AND NON-MINIMUM PHASE FADES

TECHNICAL FIELD

The present invention relates to radio communications systems and, more particularly, to a method and an apparatus for distinguishing between minimum and non-minimum phase fades.

BACKGROUND OF THE INVENTION

Multiple path fading occurs when a radio signal propagates along direct and indirect paths to the receiver. This phenomenon is caused by a variety of atmospheric conditions, such as temperature, humidity or air pressure gradients. In communications systems, fading is undesirable because it produces both amplitude and delay distortion in the received signal; the amplitude distortion being a maximum at the fade notch frequency where the direct path and indirect path signals interfere to the greatest extent. Furthermore, experimental and analytical efforts indicate that fading is a major source of transmission deterioration which, under certain conditions, exceeds system performance objectives.

In a line-of-sight radio system, fading can be represented by a 2-path model. With this model, fading is characterized as being minimum or non-minimum phase fade. With minimum phase fade, the amplitude of the signal propagating over the indirect path is less than the amplitude of the signal propagating over the direct path. Conversely, non-minimum phase fade occurs when the amplitude of the indirect path signal is greater than the amplitude of the direct path signal. It should, of course, be understood that this characterization of fading is a function of time and is basically unpredictable.

It has been found that automatic gain control as well as space diversity techniques are not adequate to maintain satisfactory transmission performance in the presence of fading. Recent efforts have centered on the use of additional equalization to mitigate fading effects and achieve the required level of system performance. Since fading is unpredictable, the compensation provided by a fade equalizer must be capable of automatically adapting for changing signal conditions. One such adaptive equalizer is disclosed by H. Miedema in a U.S. patent application, Ser. No. 158,404, filed June 11, 1980, now U.S. Pat. No. 4,330,764 dated May 18, 1982, and assigned to applicant's assignee. This equalizer compensates for amplitude distortion but does not provide proper delay equalization for non-minimum phase fade. In fact, for non-minimum phase fade the equalizer doubles the delay distortion in the received signal. In another equalizer design disclosed by the applicant in a U.S. patent application, Ser. No. 293,463, filed Aug. 17, 1981, and assigned to applicant's assignee, the equalizer parameters are modified by the character of the multiple path fading. Detecting the character of the fading, however, requires rather complex circuitry.

SUMMARY OF THE INVENTION

In accordance with the present invention, the fade character of a received double-sideband signal is determined from the location of the fade notch frequency relative to the center of the received signal frequency spectrum and the phase between fundamental components of first and second product signals. These product signals are formed using first and second spectral components of the received signal that are symmetrically disposed about the center of the received signal frequency spectrum. The fundamental components are at a common frequency. This technique is applicable to any digital or analog radio system transmitting a double-sideband signal whose sidebands are coherent in phase.

DETAILED DESCRIPTION

Figure 1:
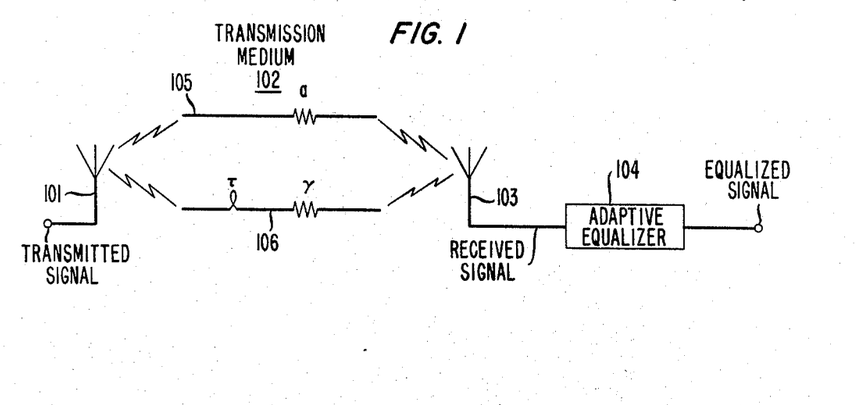
FIG. 1 is a portion of a radio communication system comprising a multiple path transmission medium.

FIG. 1 shows a portion of a radio communication system including a transmission source 101, a multi-path transmission medium 102, a receiver 103 and an adaptive equalizer 104. For a moderately broadband system, the transmission medium 102 can be represented by a two-path model. Accordingly, medium 102 is shown to include a direct path 105 and indirect path 106 between source 101 and receiver 103. During multi-path fading, the incoming signal at receiver 103 comprises a "direct" signal which propagates along direct path 105 and an "indirect" signal which propagates along indirect path 106. Path 105 is characterized by a gain factor a and path 106 is characterized by a relative delay $\tau$ and a gain factor $\gamma$. Delay $\tau$ and gain factors a and $\gamma$ all vary as a function of time.

The received signal $R(j\omega)$ is a complex function which can be expressed as:

$$R(j\omega) = a(1 + be^{-j\omega\tau})T(j\omega) \quad (1)$$

where
- $T(j\omega)$ is the transmitted signal which is also a complex function;
- $(1 + be^{-j\omega\tau})$ is the transfer function of the multi-path medium;
- a is a scale parameter;
- b is a shape parameter;
- $ab = \gamma$; and
- $\tau$ is the delay difference between the direct and indirect paths.

Figure 2:
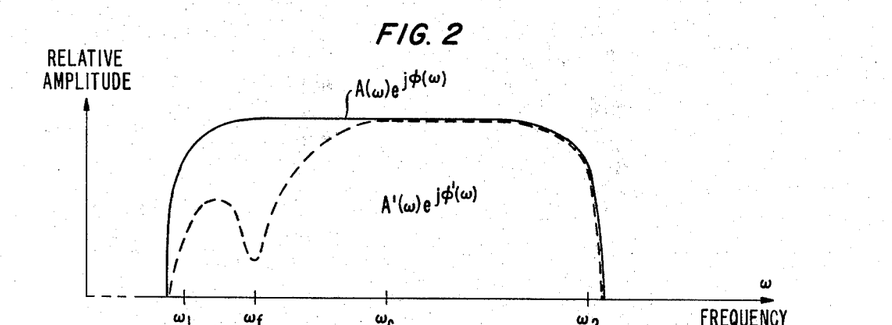
FIG. 2 is a plot of the received signal frequency spectrum in the system of FIG. 1.

The amplitude attenuation caused by fading is shown in FIG. 2. The curve $A(\omega)e^{j\phi(\omega)}$ represents the frequency spectrum of an illustrative double-sideband signal at the receiver during a free space condition, i.e., during the absence of fading. During fading, this signal is attenuated as shown by the curve labeled $A'(\omega)e^{j\phi'(\omega)}$. The greatest signal attenuation occurs at the fade notch frequency $\omega_f$.

The center of the frequency spectrum is designated as $\omega_c$. In many communications systems this is the carrier frequency. It should be noted, however, that the present invention is not limited to systems which transmit a carrier signal. Indeed, as will be shown, the present invention is applicable to any digital or analog communications systems wherein the transmitted signal comprises a double-sideband signal whose sidebands are coherent in phase. A transmitted signal having this characteristic is employed in amplitude modulation and low index frequency modulation systems.

If we let $\omega_1$ and $\omega_2$ denote frequencies higher and lower than $\omega_c$ by the same amount, then $$|\omega_c - \omega_1| = |\omega_c - \omega_2| = \Delta\omega \tag{2}$$

and $$\phi(\omega_1) = -\phi(\omega_2); \tag{3}$$

where $\phi(\omega_1)$ and $\phi(\omega_2)$ respectively are the phase of the double-sideband spectral components at $\omega_1$ and $\omega_2$ relative to $\omega_c$. This is hereinafter referred to as the unfaded spectrum phase of $\omega_1$ and $\omega_2$. Equation (3) results from the well-known odd symmetry property of any double-sideband, phase coherent signal in the absence of fading. During fading, the fade spectrum phase at $\omega_1$ and $\omega_2$, designated as $\phi'(\omega_1)$ and $\phi'(\omega_2)$ will generally be unequal in absolute value and will differ from $\phi(\omega_1)$ and $\phi(\omega_2)$.

Figure 3:
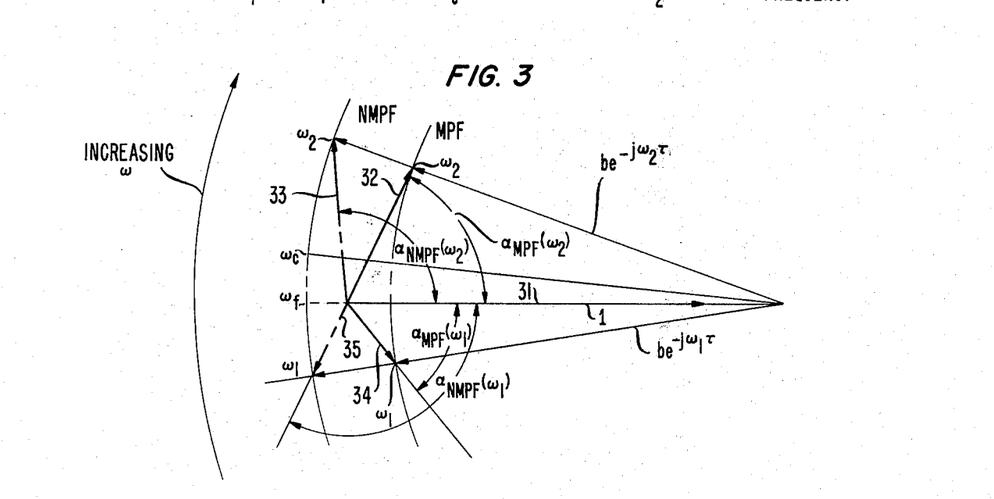
FIG. 3 is a phasor diagram illustrating the amplitude and phase of two spectral components of the received signal for minimum and non-minimum phase fade.

The amplitude and phase of the $\omega_1$ and $\omega_2$ spectral components during minimum phase fade, hereinafter designated as MPF, and non-minimum phase fade, hereinafter designated as NMPF, relative to the free space $\omega_1$ and $\omega_2$ spectral components is shown in FIG. 3. Unity phasor 31 denotes the transfer function of the transmission medium in the absence of fading and is aligned with $\omega_f$. FIG. 2 has been constructed assuming the transmission medium during fading has a transfer function equal to $1 + be^{-j\omega\tau}$ and the fade notch frequency, $\omega_f$, as in FIG. 2, is between $\omega_1$ and $\omega_c$. Phasors 32 and 33 respectively represent the amplitude and phase of the $\omega_2$ spectral component during MPF and NMPF relative to the unfaded $\omega_2$ spectral component. Similarly, phasors 34 and 35 respectively represent amplitude and phase of the $\omega_1$ spectral component during MPF and NMPF relative to the unfaded $\omega_1$ spectral component. It should be noted that if $\omega_f$ is between $\omega_c$ and $\omega_2$, the resulting phasor diagram is identical to FIG. 2 with the $\omega_1$ and $\omega_2$ designations interchanged.

Phase angles $\alpha_{MPF}(\omega_1)$ and $\alpha_{NMPF}(\omega_1)$ respectively represent the difference between the unfaded spectrum phase at $\omega_1$, $\phi(\omega_1)$, and the faded spectrum phase at $\omega_1$, $\phi'(\omega_1)$, for MPF and NMPF. The difference between the unfaded spectrum phase at $\omega_2$, $\phi(\omega_2)$, and the faded spectrum phase at $\omega_2$, $\phi'(\omega_2)$ for MPF is $\alpha_{MPF}(\omega_2)$ and $\alpha_{NMPF}(\omega_2)$ is the difference between $\phi(\omega_2)$ and $\phi'(\omega_2)$ for NMPF. Using this nomenclature we can write:

$$\phi'(\omega_1) = \phi(\omega_1) - \alpha MPF(\omega_1), \text{ and}$$

$$\phi'(\omega_2) = \phi(\omega_2) + \alpha_{MPF}(\omega_2) \tag{4}$$

for MPF, and:

$$\phi'(\omega_1) = \phi(\omega_1) - \alpha_{NMPF}(\omega_1), \text{ and}$$

$$\phi'(\omega_2) = \phi(\omega_2) + \alpha_{NMPF}(\omega_2) \tag{5}$$

for NMPF, where:

$$0 \leq \alpha_{MPF}(\omega_1), \alpha_{MPF}(\omega_2) \leq \pi/2 \tag{6}$$

and $$0 \leq \alpha_{NMPF}(\omega_1), \alpha_{NMPF}(\omega_2) \leq \pi. \tag{7}$$

The unfaded spectral components at $\omega_1$ and $\omega_2$ can be denoted by $A(\omega_1) \cos[\omega_1 t + \phi(\omega_1)]$ and $A(\omega_2) \cos[\omega_2 t + \phi(\omega_2)]$. If each of these components is mixed with a third signal at $\omega_c$, two product signals having fundamental components at $\Delta\omega$ will be generated. We can represent this third signal at $\omega_c$ by $\cos(\omega_c t + \delta)$ where $\delta$ is the phase of the third signal relative to the received signal spectral component at $\omega_c$ in the absence of fading. Designating the product signals as $P_1$ and $P_2$ we can write:

$$\begin{aligned} P_1 &= \cos(\omega_c t + \delta)[A(\omega_1)\cos(\omega_1 t + \phi(\omega_1))] \\ &= \tfrac{1}{2} A(\omega_1)\cos(\Delta\omega t - \phi(\omega_1) + \delta) + \\ &\quad \tfrac{1}{2} A(\omega_1)\cos((\omega_c + \omega_1)t + \phi(\omega_1) + \delta) \end{aligned} \tag{8}$$

and $$\begin{aligned} P_2 &= \cos(\omega_c t + \delta)[A(\omega_2)\cos(\omega_2 t + \phi(\omega_2))] \\ &= \tfrac{1}{2} A(\omega_2)\cos(\Delta\omega t + \phi(\omega_2) - \delta) + \\ &\quad \tfrac{1}{2} A(\omega_2)\cos((\omega_c + \omega_2)t + \phi(\omega_2) + \delta) \end{aligned} \tag{9}$$

If we pass product signals $P_1$ and $P_2$ through low pass filters to eliminate the $P_1$ component at the $\omega_c + \omega_1$ frequency and the $P_2$ component at the $\omega_c + \omega_2$ frequency, we obtain the fundamental components of $P_1$ and $P_2$. The fundamental component of $P_1$, designated as $x_1$, and the fundamental component of $P_2$, designated as $x_2$, are both at the difference frequency $\Delta\omega$; where $$x_1 = \tfrac{1}{2} A(\omega_1) \cos(\Delta\omega t - \phi(\omega_1) + \delta) \tag{10}$$

and $$x_2 = \tfrac{1}{2} A(\omega_2) \cos(\Delta\omega t + \phi(\omega_2) - \delta). \tag{11}$$

The phase of $x_1$ relative to $\omega_c$ is $[-\phi(\omega_1) + \delta]$ and the phase of $x_2$ relative to $\omega_c$ is $[\phi(\omega_2) - \delta]$. Accordingly, the phase difference between $x_2$ and $x_1$ is:

$$[\phi(\omega_2) - \delta] - [-\phi(\omega_1) + \delta] = -2\delta; \tag{12}$$

since $\phi(\omega_2) = -\phi(\omega_1)$ from equation (3).

It is evident, therefore, that in the absence of fading, $x_2$ lags $x_1$ by an amount $2\delta$. Therefore, if a phase shift $\theta$ is introduced into $x_2$ to bring $x_2$ in phase with $x_1$ we require:

$$\phi(\omega_2) - \delta + \theta = -\phi(\omega_1) + \delta \tag{13}$$

which yields:

$$\theta = 2\delta. \tag{14}$$

We will hereinafter designate $2\delta$ as $\theta_o$.

Next, consider the faded received signal spectrum shown in FIG. 2. If we re-write equations (10) and (11) in terms of the faded spectrum parameters $A'(\omega)$ and $\phi'(\omega)$; we obtain:

$$x_1 = \tfrac{1}{2} A'(\omega_1) \cos(\Delta\omega t - \phi'(\omega_1) + \delta) \tag{15}$$

and $$x_2 = \tfrac{1}{2} A'(\omega_2) \cos(\Delta\omega t + \phi'(\omega_2) - \delta). \quad (16)$$

Equations (15) and (16) represent the fundamental components $x_1$ and $x_2$ in the presence of fading.

Assuming MPF, we can substitute equation (4) into equations (15) and (16) to obtain:

$$x_1 = \tfrac{1}{2} A'(\omega_1) \cos(\Delta\omega t - \phi(\omega_1) + \alpha\text{MPF}(\omega_1) + \delta) \quad (17)$$

and $$x_2 = \tfrac{1}{2} A'(\omega_1) \cos(\Delta\omega t + \phi(\omega_2) + \alpha_{MPF}(\omega_2) - \delta). \quad (18)$$

Again, we can examine the phase of $x_2$ relative to that of $x_1$ during fading. If a phase shift $\theta$ is introduced into $x_2$ to force it in phase with $x_1$, we require that:

$$\phi(\omega_2) + \alpha\text{MPF}(\omega_2) - \delta + \theta = -\phi(\omega_1) + \alpha_{MPF}(\omega_1) + \delta \quad (19)$$

which yields:

$$\theta = 2\delta + [\alpha_{MPF}(\omega_1) - \alpha_{MPF}(\omega_2)]$$

$$\theta = \theta_o + [\alpha_{MPF}(\omega_1) - \alpha_{MPF}(\omega_2)]. \quad (20)$$

Examining the bracketed term in equation (20) and FIG. 2 it is evident that since $\alpha_{MPF}(\omega_1) < \alpha_{MPF}(\omega_2)$, $[\alpha_{MPF}(\omega_1) - \alpha_{MPF}(\omega_2)]$ will be negative if $\omega_f < \omega_c$. It is also evident from FIG. 2 and the associated discussion that $[\alpha_{MPF}(\omega_1) - \alpha_{MPF}(\omega_2)]$ will be positive if $\omega_f < \omega_c$.

If we assume NMPF, equation (20) becomes:

$$\theta = 2\delta + [\alpha_{NMPF}(\omega_1) - \alpha\text{NMPF}(\omega_2)]. \quad (21)$$

This time the bracketed term in equation (21) will be negative if $\omega_f < \omega_c$ and positive if $\omega_f < \omega_c$.

Hence, if we compare the value of $\theta$ required to bring $x_2$ and $x_1$ in phase during free space conditions with the value of $\theta$ required to bring $x_2$ and $x_1$ in phase during fading and we know the location of $\omega_f$ relative to $\omega_c$ we can distinguish between MPF and NMPF.

If $\omega_f = \omega_c$, the above approach does not differentiate between MPF and NMPF since $\alpha_{MPF}(\omega_1) = \alpha_{MPF}(\omega_2)$, $\alpha_{NMPF}(\omega_1) = \alpha_{NMPF}(\omega_2)$ and $\theta = \theta_o$. However, we can distinguish between MPF and NMPF when $\omega_f = \omega_c$ if we form the product signal $P_c$; defined by:

$$P_c = \cos \omega_c t [A'(\omega_c) \cos(\omega_c t + \phi'(\omega_c))]; \quad (22)$$

where the first term $\cos \omega_c t$ is equal to the above-referenced third signal, $\cos(\omega_c t + \delta)$, shifted in phase by an amount $-\delta$; and the bracketed term $A'(\omega_c) \cos(\omega_c t + \phi'(\omega_c))$ is the faded $\omega_c$ spectral component of the received signal.

During MPF, $\phi'(\omega_c) = 0$ and equation (22) becomes:

$$\begin{aligned} P_c &= \cos\omega_c t [A'(\omega_c)\cos\omega_c t] \quad (23) \\ &= A'(\omega_c)\cos^2\omega_c t \\ &= \tfrac{1}{2} A'(\omega_c) + \tfrac{1}{2} A'(\omega_c)\cos 2\omega_c t \end{aligned}$$

The dc component of $P_c$ during MPF is equal to $\tfrac{1}{2} A'(\omega_c)$ and is a positive quantity.

During NMPF, $\phi'(\omega_c) = \pi$ and equation (22) becomes:

$$\begin{aligned} P_c &= \cos\omega_c t [A'(\omega_c)\cos(\omega_c t + \pi)] \quad (24) \\ &= \cos\omega_c t [A'(\omega_c)(-\cos\omega_c t)] \\ &= -A'(\omega_c)\cos^2\omega_c t \end{aligned}$$

-continued
$$= -\tfrac{1}{2} A'(\omega_c) - \tfrac{1}{2} A'(\omega_c)\cos 2\omega_c t$$

The dc component of $P_c$ during NMPF is equal to $-\tfrac{1}{2}A'(\omega_c)$ which is a negative quantity.

Figure 4:
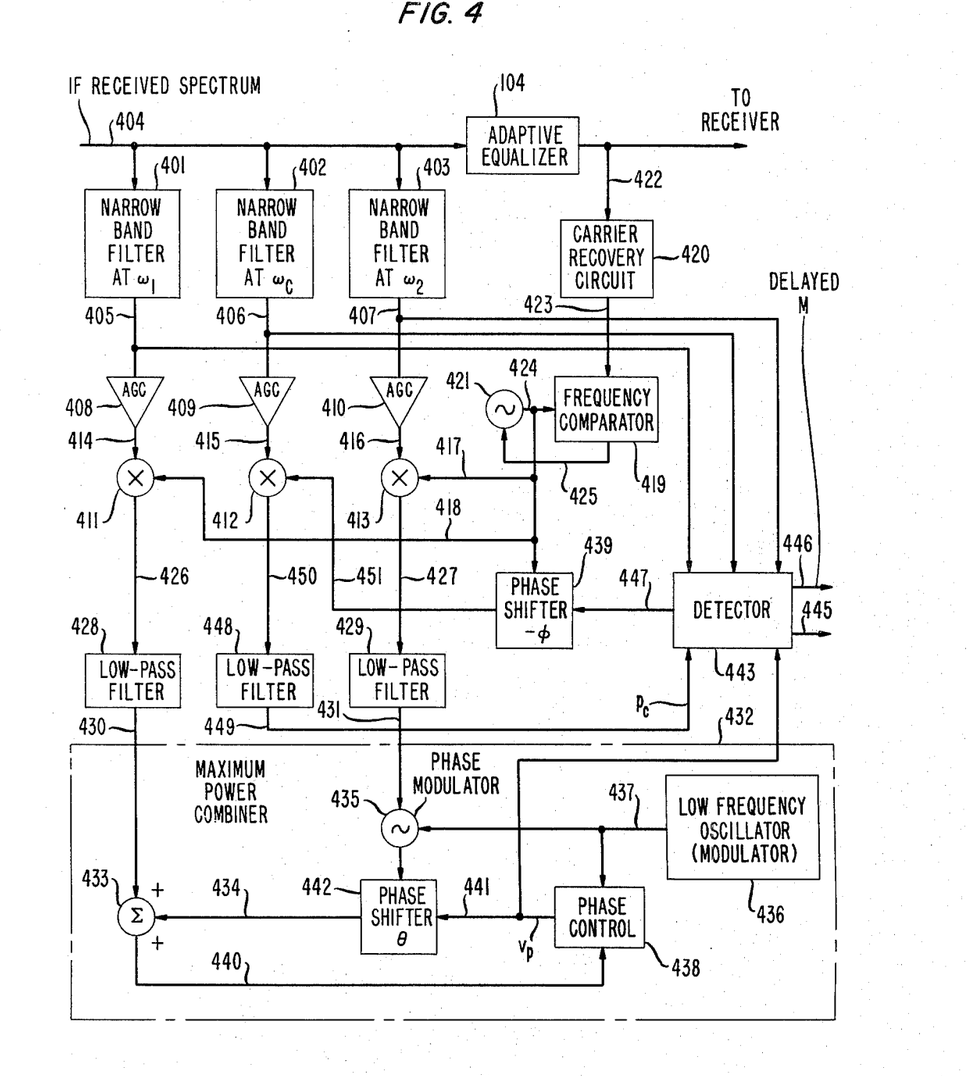
FIG. 4 is a block diagram of a first embodiment of the present invention.

Refer now to FIG. 4 which shows how the foregoing relationships can be used to determine the fade character. Narrowband filters 401, 402 and 403, supplied with an intermediate frequency (IF) received signal spectrum on lead 404, respectively extract spectral components at the $\omega_1$, $\omega_c$ and $\omega_2$ frequencies. As discussed, supra, $\omega_c$ is at the center of the frequency spectrum and $\omega_1$ and $\omega_2$ are symmetrically disposed about $\omega_c$. Leads 405, 406 and 407 couple the $\omega_1$, $\omega_c$ and $\omega_2$ spectral components to automatic gain control (AGC) amplifiers 408, 409 and 410. These amplifiers are preferably used to amplify the spectral components and enhance the dynamic range of operation. The use of such amplifiers, however, is not always necessary. Mixers 411, 412 and 413 are connected by leads 414, 415 and 416 to the output of AGC amplifiers 408, 409 and 410.

Mixers 411 and 413 form product signals $P_1$ and $P_2$ by multiplying the $\omega_1$ and $\omega_2$ spectral components with the third signal, $\cos(\omega_c t + \delta)$. The third signal is coupled to mixers 411 and 413 via leads 417 and 418 from lead 424 at the output of local oscillator 421. The third signal is generated by carrier recovery circuit 420, local oscillator 421 and frequency comparator 419. Carrier recovery circuit 420, coupled through lead 422 to the output of equalizer 104, recovers the carrier signal at $\omega_c$ and couples the same over lead 423 to frequency comparator 419. Adaptive equalizer 104 by definitions compensates for amplitude and delay distortion caused by fading. Consequently, the phase of the recovered carrier does not vary with the presence or absence of fading. Comparator 419, in well-known fashion, compares the frequency of the recovered carrier on lead 423 with the frequency of the oscillator output signal on lead 424 and produces a control signal on lead 425 which drivers the frequency of oscillator 421 toward $\omega_c$.

Product signals $P_1$ and $P_2$ are connected by leads 426 and 427 to low-pass filters 428 and 429. Filter 428 eliminates the $P_1$ product signal component at the $\omega_c + \omega_1$ frequency to generate the fundamental component $x_1$ on lead 430. Similarly, filter 429 eliminates the $\omega_c + \omega_2$ component from product signal $P_2$ to produce fundamental component $x_2$ on lead 431.

At this point, it should be understood that the present invention requires only that product signals, using the $\omega_1$ and $\omega_2$ spectral components, be formed having fundamental components at the same frequency. Accordingly, any third signal having a non-zero spectral component at $\omega_c$ can be used for mixing. For example, in lieu of frequency comparator 419, carrier recovery circuit 420 and oscillator 421, the recovered carrier itself, or a broadband signal having a non-zero $\omega_c$ component, such as the received signal, could be mixed with the $\omega_1$ and $\omega_2$ spectral components.

The phase between fundamental components $x_1$ and $x_2$ is determined through the use of maximum power combiner 432. Such power combiners have been heretofore used in space diversity systems to maximize the power of the incoming signals. (See, for example, U.S. Pat. No. 4,160,952). In power combiner 432, summer 433 adds fundamental component $x_1$ on lead 430 to a phase-shifted fundamental component $x_2$ on lead 434. Phase modulator 435, driven by low frequency oscillator 436 through lead 437 varies the phase of fundamental component $x_2$. The amplitude of the summed fundamental components $x_1$ and $x_2$ will vary with this phase modulation. Phase control 438, also connected through lead 437 to low frequency oscillator 436, detects the amplitude modulation of the summed fundamental components $x_1$ and $x_2$ on lead 440. Phase control 438 then generates a control signal $v_p$ on lead 441 which drives variable phase shifter 442. Control signal $v_p$ varies the phase of fundamental component $x_2$ until fundamental components $x_1$ and $x_2$ are aligned in phase. The amplitude of $v_p$ corresponds to the phase shift $\theta$ provided by pahse shifter 442. Control signal $v_p$ is also supplied to detector 443 via lead 441.

Detector 443 produces two 2-level output signals on leads 445 and 446. A predetermined level on lead 446 indicates the presence of fading during which time the signal level on lead 445 indicates the fade character. When $\omega_f \neq \omega_c$, the type of fade is determined from the value of $v_p$ on lead 441 along with the location of $\omega_f$ relative to $\omega_c$. The relative location of $\omega_f$ is determined from a comparison of the amplitudes of the $\omega_1$, $\omega_c$ and $\omega_2$ spectral components on leads 405, 406 and 407. This comparison also indicates the presence or absence of fading. When $\omega_f = \omega_c$, detector 443 distinguishes between the fade character by examining the polarity of the dc component of product signal $P_c$ defined in equation (22). Mixer 412 forms product signal $P_c$ by multiplying the $\omega_c$ spectral component on lead 406 by a modified third signal $\cos \omega_c t$ on lead 451. This modified third signal is generated by phase shifting the third signal $\cos(\omega_c t + \delta)$ by an amount $-\delta$. This phase shift of $-\delta$ is provided by phase shifted 439 in response to a signal from detector 443 on lead 447. Low pass filter 448, connected to mixer 412 by lead 450, extracts the dc component of product signal $P_c$ and connects the same through lead 449 to detector 443.

Figure 5:
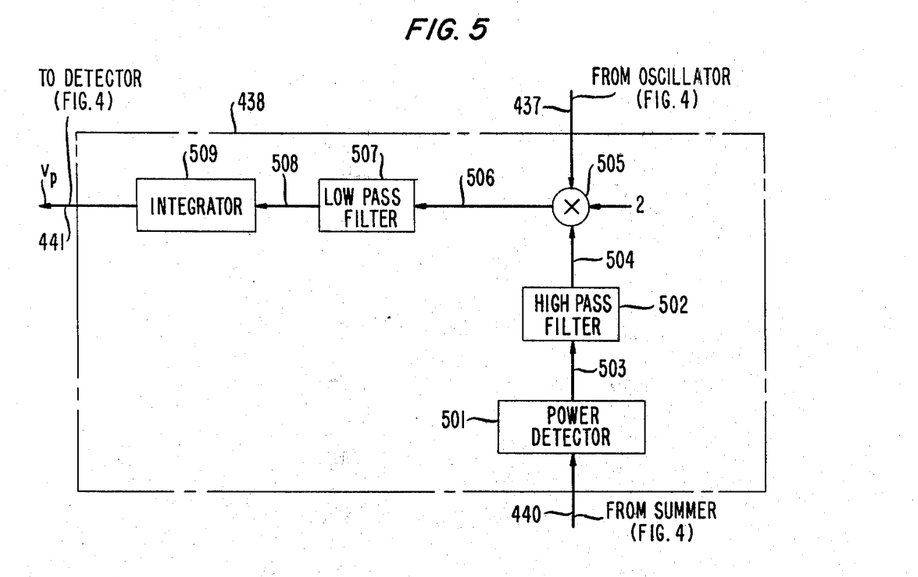
FIG. 5 is a detailed schematic of the phase control block in FIG. 4.

The circuitry within phase control 438 which generates control signal $v_p$ is shown in FIG. 5. The output of summer 433 is coupled via lead 440 to power detector 501. The detected power has a dc and amplitude modulated component, the latter at the frequency of oscillator 436. High pass filter 502 receives the detector power on lead 503, extracts the dc component, and passes the amplitude modulated component through lead 504 to multiplier 505. Multiplier 505 forms two times the product of the detected amplitude modulated component and the low frequency oscillating signal on lead 437 from oscillator 436. This multiplication forms a signal on lead 506 having a term equal to the amplitude of the amplitude modulated component. This term is isolated by low pass filter 507 and coupled over lead 508 to integrator 509 where it is averaged to generate control signal $v_p$. For simplicity, it has been assumed that there is a 1 to 1 relation between the phase shift $\theta$ provided by phase shifter 442 and the voltage of control signal $v_p$.

Figure 6:
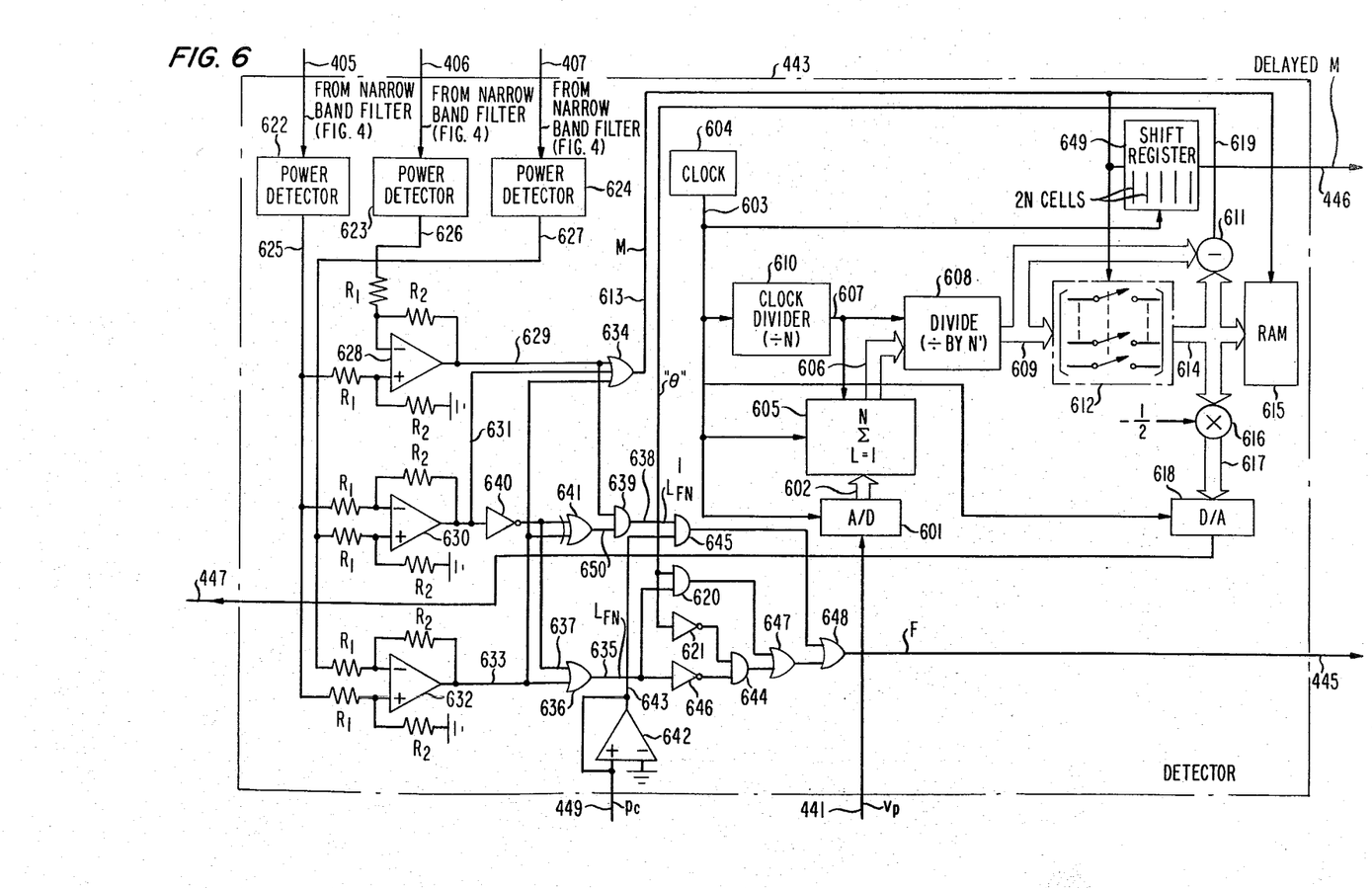
FIG. 6 is a schematic of the detector block shown in FIG. 4.

The detailed circuitry within detector 443 is shown in FIG. 6. The output F on lead 445 indicates the fade character, MPF or NMPF, when fading is present. MPF and NMPF are respectively denoted by a logical "1" and "0". Signal delayed M on lead 446 indicates the presence or absence of fading by a logical "1" or "0", respectively. During the absence of fading, the logical level on lead 445 should be ignored.

Figure 7:
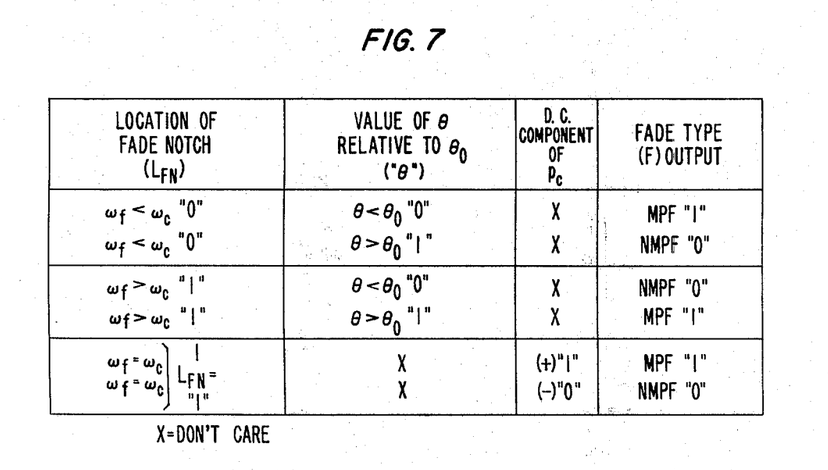
FIG. 7 is a summary of the fade type output signal generated by FIG. 4 as a function of the phase relationship of the spectral components shown in FIG. 3 and the location of the fade notch frequency.

FIG. 7 summarizes the input conditions which generate the "1" and "0" levels of signal F. When $\omega_f \neq \omega_c$, signal F is a function of the location of $\omega_f$ relative to $\omega_c$ and the difference of the phase between $\omega_f$ and $x_1$ during fading, $\theta$, and the phase between $x_2$ and $x_1$, in the absence of fading, $\theta_o$. This phase difference $\theta - \theta_o$ is designated as "$\theta$". "$\theta$" is logical "0" when $\theta < \theta_o$ and is logical "1" when $\theta > \theta_o$. The relative location of $\omega_f$ is represented by 2-level signal $L_{FN}$. A logical "0" level of $L_{FN}$ indicates that $\omega_f < \omega_c$ while a logical "1" level of $L_{FN}$ indicates that $\omega_f > \omega_c$. When $\omega_f = \omega_c$ variable $L'_{FN} = 1$ and output F is a function of the polarity of the dc component of product signal $P_c$. A positive and negative polarity of this dc component is respectively represented by a logical "1" and "0".

The determination of "$\theta$" will now be discussed in reference to FIG. 6. Control signal $v_p$ on lead 441 is coupled to analog to digital (A/D) converter 601. Converter 601, on the occurrence of a clock pulse on lead 603 from clock 604, samples $v_p$ and quantizes each analog voltage sample into a digital word on bus 602. Accumulator 605, bus 606, clock divider 610 and divider 608 form a digital word averager. Accumulator 605 generates on bus 606 the sum of N consecutive digital words on bus 602. Lead 603 connects clock 604 pulses to accumulator 605 to synchronize the summing operation of accumulator 605 with the A/D conversion provided by converter 601. A reset pulse on lead 607 zeroes accumulator 605 and causes divider 608 to divide the sum of N consecutive digital words on bus 606 by N and couple this quotient to bus 609. The reset pulse is generated every N clock pulses by clock divider 610. Clock divider 610 receives each clock 604 pulse via lead 603.

Bus 609 is connected to digital subtractor 611 and multi-pole switch 612, the latter being controlled by signal M on lead 613. Switch 612, while schematically drawn as a mechanical switch, is an electronic switch. When signal M equals logical "0", indicating the absence of fading, switch 612 is closed to couple the contents of bus 609 to bus 614. Signal M is also connected to the write/read terminals of RAM 615. Only one fixed memory location is used in RAM 615. When M equals logical "0", the contents of bus 614 are written into RAM 615. Therefore, RAM 615 stores a recent, averaged digital representation of $v_p$ in the absence of fading. Again, for simplicity we assume a 1 to 1 relationship between voltage $v_p$ and phase $\theta$. Accordingly, the value on bus 614 which stored in RAM 615 is equal to $\theta_o$. The value of $\theta_o$ is also connected through multiplier 616 which multiplies $\theta_o$ by $-\frac{1}{2}$ to generate a digital word representation of $-\delta$. Digital to analog converter 618 converts the digital representation of $-\delta$ to an analog voltage on lead 447. This analog voltage directly varies the phase shift provided by phase shifter 439.

When signal M equals logic "1", switch 612 is open and the contents of RAM 615 are read out onto bus 614. Digital subtractor 611 forms the difference $\theta - \theta_o$ by subtracting the contents of bus 614 from the contents of bus 609. The most significant bit or polarity bit from this difference is supplied to lead 619. This polarity bit is "$\theta$" as it indicates the relative magnitudes of $\theta$ and $\theta_o$. Lead 619 supplies "$\theta$" to an input of AND gate 620 and to the input of inverter 621.

The presence of fading and the location of $\omega_f$ relative to $\omega_c$ are determined by comparing the powers of the $\omega_1$, $\omega_c$ and $\omega_2$ spectral components respectively designated as $a(\omega_1)$, $a(\omega_c)$ and $a(\omega_2)$. The designation $a(\omega)$ denotes the power of either the faded amplitude $A'(\omega)$ or the unfaded amplitude $A(\omega)$. Power detectors 622, 623 and 624, supplied with the $\omega_1$, $\omega_c$ and $\omega_2$ spectral components on leads 405, 406 and 407, form the signals $a(\omega_1)$, $a(\omega_c)$ and $a(\omega_2)$ on leads 625, 626 and 627, respectively. Difference amplifier 628 forms G[a($\omega_1$)−a($\omega_c$)] on lead 629, difference amplifier 630 forms G[a($\omega_2$)−a($\omega_1$)] on lead 631 and difference amplifier 632 forms the difference G[a($\omega_1$)−a($\omega_2$)] on lead 633. Difference amplifiers 628, 630 and 632 are all finite positive gain amplifiers having a gain factor G equal to the $$\frac{\text{value of resistor } R_2}{\text{value of resistor } R_1}.$$

Each difference amplifier produces a high level output, logical "1", if the input difference is positive, and a low level, logical "0", output if the input difference is zero or negative. The high and low output levels of all three difference amplifiers are compatible with the switching thresholds of all the logic gates in FIG. 6.

Signal M is generated by coupling leads 629, 631 and 633 to OR gate 634. The output of OR gate 634 is logical "1" if the signals a($\omega_1$), a($\omega_c$) and a($\omega_2$) are unequal thereby indicating the presence of fading. Signal M is coupled through shift register 649 to lead 446. Shift register 649, clocked by clock 604 via lead 603, provides a delay of 2N clock pulses to signal M. This delay assures that signal F is indicative of the fade character when a logical "1" exists on lead 446.

Signal $L_{FN}$ is generated on lead 635 at the output of OR gate 636. OR gate 636 is supplied with G[a($\omega_1$)−a($\omega_2$)] on lead 633 and the inversion of G[a($\omega_2$)−a($\omega_1$)] on lead 637 generated by inverter 640. The signal G[a($\omega_2$)−a($\omega_1$)] is logical "1" if $\omega_f$ is less than $\omega_c$ and G(a($\omega_1$)−a($\omega_2$)) is logical "1" if $\omega_f$ is greater than $\omega_c$. Therefore, $L_{FN}$ is logical "1" if $\omega_f > \omega_c$ and logical "0" if $\omega_f < \omega_c$.

Signal $L'_{FN}$, which is equal to logical "1" only when $\omega_f = \omega_c$, is produced on lead 638 at the output of AND gate 639. The inputs to AND gate 639 are lead 629 and lead 650, the latter being the output of Exclusive-OR gate 641. Gate 461 is supplied with the output of inverter 640 and lead 633.

It should, of course, be understood that the location of $\omega_f$ relative to $\omega_c$ can be determined by comparing the amplitude of a spectral component $< \omega_c$ with the amplitude of a spectral component $> \omega_c$. A determination of $\omega_f = \omega_c$ or the absence of fading additionally requires that the amplitude of $\omega_c$ be compared with the other two spectral components.

The dc component of product signal $P_c$ is coupled to the positive input of difference amplifier 642. Lead 643 at the output of amplifier 642 is logical "1" when the dc component of $P_c$ is positive and logical "0" when the dc component of $P_c$ is negative.

Output signal F on lead 445 is generated from signals $L_{FN}$, $L'_{FN}$, "θ" on the polarity of the dc component of $P_c$, $P_c$, using AND gates 620, 644, 645, inverters 621, 646 and OR gates 647 and 648. The governing equation is:

$$F = \overline{L}_{FN} \cdot \overline{\theta} + L_{FN} \cdot \theta + L'_{FN} \cdot P_c \quad (25)$$

where the dot indicates logical AND and the plus indicates logical OR.

Figure 8:
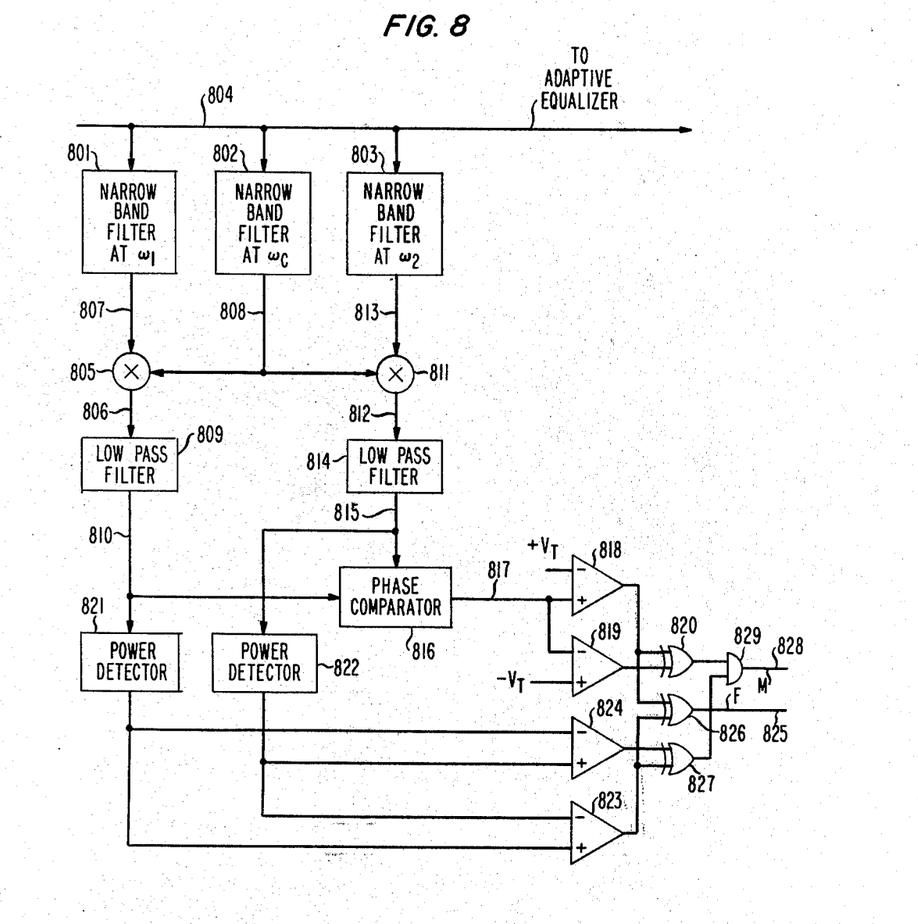
FIG. 8 is a second embodiment of the present invention.

A second embodiment of the present invention, shown in FIG. 8, can detect the fade character provided that $\omega_f \neq \omega_c$. As in the first embodiment, a logical "1" and "0" level of signal F respectively denote MPF and NMPF when signal M is a logical "1" indicating the presence of fading.

Referring to FIG. 8, narrow band filters 801, 802 and 803 extract the $\omega_1$, $\omega_c$ and $\omega_2$ spectral components from the received signal spectrum on lead 804. Mixer 805 forms a first product signal on lead 806 by multiplying the $\omega_1$ and $\omega_c$ components on leads 807 and 808. Low pass filter 809 provides the fundamental component, $x'_1$, on lead 810. Similarly, mixer 811 generates a second product signal on lead 812 by multiplying the $\omega_c$ and $\omega_2$ components on leads 808 and 813. Fundamental component $x'_2$ is generated on lead 815 by low pass filter 814. Fundamental components $x'_1$ and $x'_2$ are each at the $\Delta\omega$ frequency and are identical in form to equations (10) and (11) with the $+\delta$ and $-\delta$ terms deleted. Therefore, in the absence of fading, the phase of $x'_1$ is equal to the phase of $x'_2$. If $x'_1$ leads $x'_2$ in phase, the fade character is MPF if $\omega_f < \omega_c$ and NMPF if $\omega_f > \omega_c$. Similarly, if $x'_1$ lags $x'_2$ in phase, the fade character is NMPF if $\omega_f < \omega_c$ and MPF if $\omega_f > \omega_c$.

The phase relationship of $x'_1$ and $x'_2$ is determined by phase comparator 816. Comparator 816 generates a logical "1" on lead 817 if $x'_1$ leads $x'_2$ and logical "0" if $x'_1$ lags $x'_2$. To eliminate noise effects, the output of comparator 816 is coupled to the positive and negative inputs of difference amplifiers 818 and 819 which are biased by voltage thresholds $+V_T$ and $-V_T$.

If the output voltage of comparator 816 is greater than $V_T$ or less than $-V_T$, the signal levels on the outputs of amplifiers 818 and 819 are always opposite in polarity and a logical "1" is generated at the output of Exclusive-OR gate 820.

The amplitudes of the $\omega_1$ and $\omega_2$ spectral component are detected by power detector 821 and 822 and coupled to difference amplifiers 823 and 824. Difference amplifiers 823 and 824, like amplifiers 818 and 819 are finite gain amplifiers whose output levels are compatible with the switching thresholds of the logic gates used. The output of amplifier 823 is logical "1" if $\omega_f > \omega_c$ and logical "0" if $\omega_f < \omega_c$. Signal F on lead 825 is formed by Exclusive-OR gate 826. The inputs of gate 826 are the outputs of amplifiers 823 and 818.

Exclusive-OR gate 827 is supplied with the outputs of amplifiers 823 and 824. The output of Exclusive-OR gate 827 is logical "1" if fading is present and logical "0" if fading is absent. Signal M on lead 828 is formed by AND gate 829. AND gate 829 is supplied with the outputs of Exclusive-OR gates 820 and 827.

The output signals F and M in either of the above embodiments may be utilized in an adaptive equalizer to correctly compensate for delay distortion during fading or may be used for analytical purposes to determine the presence and character of the signal fading.

What is claimed is:

1. In apparatus for receiving a fade susceptible phase-coherent double-sideband signal having maximum amplitude distortion during fading at a fade notch frequency, a fade character detector characterized by means (e.g. 401, 403, 411, 413, 419, 420, 421 or 801, 802, 803, 805, 811) for respectively forming a first signal and a second signal from first and second spectral components of said double-sideband signal symmetrically disposed about the center of the double-sideband frequency spectrum, said forming means shifting said first and second spectral components in frequency so that each of said first and second signals have a fundamental component at a common frequency, means (e.g. 622, 623, 624, 6238, 630, 632, 634, 636, 639, 640, 641 or 821, 822, 823, 824) for determining the location of the fade notch frequency relative to the center of the double-sideband signal frequency spectrum, means (e.g. 428, 429, 432, 601, 604, 605, 608, 610, 611, 612, 615 or 809, 814, 816) for determining the phase between said fundamental component of said first signal and said fundamental component of said second signal, and means (e.g. 620, 621, 634, 644, 645, 646, 647 and 648 or 818, 826, 827) responsive to the determined fade notch location and the determined phase for detecting when the fade is minimum phase fade and when the fade is non-minimum phase fade.

2. The fade character detector of claim 1 further including means (402, 412, 439, 448) for signal from a third spectral component of said double-sideband signal disposed at the center of the double-sideband signal frequency spectrum, said third signal having a dc component.

3. The fade character detector of claim 2 further including means (642, 645, 648) responsive to said dc component and the determined fade notch location for determining when the fade is minimum phase fade and when the fade is non-minimum phase fade.

4. The fade character detector of claim 3 wherein said fade notch location determining means is responsive to the amplitudes of said first, second and third spectral components.

5. The fade character detector of claim 4 wherein said fade notch location determining means determines the absence of fading.

6. The fade character detector of claim 5 wherein said means for detecting minimum phase fade and non-minimum phase fade stores the phase between said fundamental components of said first and second product signals in the absence of fading.

7. The fade character detector of claim 1 wherein said fade notch location determining means is responsive to the amplitudes of said first and second spectral components.

8. The fade character detector of claim 7 wherein said fade notch location determining means determines the absence of fading.

9. A method of detecting the fade character of a phase coherent double-sideband signal having maximum amplitude distortion during fading at a fade notch frequency characterized by the steps of forming (e.g. 401, 403, 411, 413, 419, 420, 421 or 801, 802, 803, 805, 811) a first signal and a second signal respectively from first and second spectral components of said double-sideband signal symmetrically disposed about the center of the double-sideband signal frequency spectrum, each of said first and second signals having a fundamental component at a common frequency by the frequency shifting of said first and second spectral components, determining (e.g. 622, 623, 624, 628, 630, 632, 634, 636, 639, 640, 641 or 821, 822, 823, 824) the location of the fade notch frequency relative to the center of the double-sideband signal frequency spectrum, determining (e.g. 428, 429, 432, 601, 604, 605, 608, 610, 611, 612, 615 or 809, 814, 816) the phase between said fundamental component of said first signal and said fundamental component of said second signal, and generating (e.g. 620, 621, 634, 644, 645, 646, 647 and 648 or 818, 826, 827) an output signal which distinguishes between minimum and non-minimum phase fades, in response to the determined fade notch location and the determined phase.

10. The method of claim 9 further including the step of deriving (402, 412, 439, 448) a third signal from a third spectral component of said double-sideband signal disposed at the center of the double-sideband signal frequency spectrum, said third signal having a dc component.

11. The method of claim 10 wherein said output signal is responsive to said dc component when the determined fade notch location is at the center of said double-sideband signal frequency spectrum.

12. The method of claim 11 wherein the step of determining the relative location of the fade notch frequency is made in response to the amplitudes of said first, second and third spectral components.

13. The method of claim 12 wherein the step of the determining the relative location of the fade notch frequency includes determining the absence of fading.

14. The method of claim 13 wherein the step of generating an output signal includes storing (612, 615) the phase between said fundamental components of said first and second signals in the absence of fading.

15. The method of claim 8 wherein the step of determining the relative location of the fade notch frequency is made in response to the amplitudes of said first and second spectral component.

16. The method of claim 15 wherein the step of determining the relative location of the fade notch frequency includes determining the absence of fading.

* * * * *

UNITED STATES PATENT AND TRADEMARK OFFICE
CERTIFICATE OF CORRECTION

PATENT NO. : 4,403,351
DATED : September 6, 1983
INVENTOR(S) : Peter D. Karabinis It is certified that error appears in the above—identified patent and that said Letters Patent is hereby corrected as shown below:

Column 3, Eq. (4), "αMPF" should read --$\alpha_{MPF}$--. Column 4, Eq. (6), "$\leq$", both occurrences, should read --$\leq$--; Eq. (7), "$\leq$", both occurrences, should read --$\leq$--; Eq. (10), "=", second occurrence, should read -- - --. Column 5, Eq. (17), "αMPF" should read --$\alpha_{MPF}$--; Eq. (19), "αMPF" should read --$\alpha_{MPF}$--. Column 7, line 33, "shifted" should read --shifter--; line 58, after "output" insert --signal--. Column 9, line 39, "461" should read --641--; line 54, "on" should read --and--; line 55, "P", second occurrence, should read --p--. Column 9, Eq. (25), "θ", both occurrences, should read --θ--. Column 10, line 5, "ωc" should read --$\omega_c$--; line 67, "6238" should read --628--. Column 11, line 16, after "for" insert --forming a third--; line 37, delete "product".

Signed and Sealed this

Twenty-eighth Day of February 1984

[SEAL]

Attest:

GERALD J. MOSSINGHOFF

Attesting Officer

Commissioner of Patents and Trademarks